United States Patent
Mukaida et al.

(10) Patent No.: US 11,239,669 B2
(45) Date of Patent: Feb. 1, 2022

(54) UNDERWATER POWER SUPPLY SYSTEM

(71) Applicant: KAWASAKI JUKOGYO KABUSHIKI KAISHA, Kobe (JP)

(72) Inventors: Minehiko Mukaida, Kobe (JP); Noriyuki Okaya, Kobe (JP); Koichi Fukui, Akashi (JP); Makoto Mukai, Kobe (JP); Fumitaka Tachinami, Kobe (JP); Yuki Kaga, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/252,426

(22) PCT Filed: Jun. 14, 2019

(86) PCT No.: PCT/JP2019/023635
§ 371 (c)(1),
(2) Date: Dec. 15, 2020

(87) PCT Pub. No.: WO2019/240256
PCT Pub. Date: Dec. 19, 2019

(65) Prior Publication Data
US 2021/0188104 A1 Jun. 24, 2021

(30) Foreign Application Priority Data
Jun. 15, 2018 (JP) .............................. JP2018-114293

(51) Int. Cl.
*H02J 7/00* (2006.01)
*B60L 50/50* (2019.01)
(Continued)

(52) U.S. Cl.
CPC ............ *H02J 7/0013* (2013.01); *B60L 50/50* (2019.02); *B60L 53/12* (2019.02); *B60L 53/80* (2019.02);
(Continued)

(58) Field of Classification Search
CPC .......... B60L 53/12; B60L 50/50; B60L 53/80; B60L 2200/32; H02J 50/005;
(Continued)

(56) References Cited

U.S. PATENT DOCUMENTS 6,223,675 B1 * 5/2001 Watt ....................... B63G 8/001
114/312

FOREIGN PATENT DOCUMENTS

JP 2004-166459 A 6/2004

* cited by examiner

*Primary Examiner* — Carlos Amaya
(74) *Attorney, Agent, or Firm* — Oliff PLC

(57) ABSTRACT

An underwater power supply system includes: a working apparatus arranged underwater with at least one power receiving pad; a first battery unit detachably attached to the apparatus with a power supplying pad and battery, the pad configured to supply electric power to the power receiving pad in a non-contact state, the battery electrically connected to the power supplying pad; and an underwater sailing body configured to shuttle between the apparatus and a surface ship or an underwater station suspended from the surface ship, the body configured to carry a second battery unit to the apparatus, detach the first battery unit from the apparatus, and attach the second battery unit to the apparatus, the second battery unit including a power supplying pad and battery, the pad configured to supply the electric power to the power receiving pad in a non-contact state, the battery electrically connected to the power supplying pad.

8 Claims, 4 Drawing Sheets

(51) Int. Cl.
*B60L 53/12* (2019.01)
*B60L 53/80* (2019.01)
*H02J 50/00* (2016.01)
*B63C 11/00* (2006.01)
*B63G 8/00* (2006.01)

(52) U.S. Cl.
CPC .............. *B63C 11/00* (2013.01); *B63G 8/001* (2013.01); *H02J 7/0063* (2013.01); *H02J 50/005* (2020.01); *B60L 2200/32* (2013.01); *B63G 2008/004* (2013.01); *H02J 2310/42* (2020.01)

(58) Field of Classification Search
CPC .... H02J 7/0013; H02J 7/0063; H02J 2310/42; B63C 11/00; B63G 8/001; B63G 2008/004
See application file for complete search history.

UNDERWATER POWER SUPPLY SYSTEM

TECHNICAL FIELD

The present invention relates to an underwater power supply system.

BACKGROUND ART

Working apparatuses, such as underwater stations and AUVs (Autonomous Underwater Vehicles), arranged underwater are conventionally equipped with batteries as driving sources. For example, PTL 1 describes that a battery attached to an underwater station is charged by non-contact power supply from an underwater robot connected to a surface ship through a cable.

CITATION LIST

Patent Literature

PTL 1: Japanese Laid-Open Patent Application Publication No. 2004-166459

SUMMARY OF INVENTION

Technical Problem

However, as described in PTL 1, when charging the battery attached to the working apparatus arranged underwater, the surface ship has to stand by on the sea for a long period of time until the completion of the charging of the battery, and therefore, a large amount of fuel is consumed.

An object of the present invention is to provide an underwater power supply system capable of shortening a standby time of a surface ship.

Solution to Problem

To solve the above problems, an underwater power supply system according to the present invention includes: a working apparatus arranged underwater and including at least one power receiving pad; a first battery unit detachably attached to the working apparatus and including a power supplying pad and a battery, the power supplying pad being configured to supply electric power to the power receiving pad in a non-contact state, the battery being electrically connected to the power supplying pad; and an underwater sailing body configured to shuttle between the working apparatus and a surface ship or between the working apparatus and an underwater station suspended from the surface ship, the underwater sailing body being configured to carry a second battery unit to the working apparatus, detach the first battery unit from the working apparatus, and attach the second battery unit to the working apparatus, the second battery unit including a power supplying pad and a battery, the power supplying pad being configured to supply the electric power to the power receiving pad in a non-contact state, the battery being electrically connected to the power supplying pad.

According to the above configuration, when the amount of electric power stored in the battery of the first battery unit attached to the working apparatus becomes small, the second battery unit is attached to the working apparatus in place of the first battery unit. To be specific, the surface ship does not have to stand by on the sea until the completion of the charging of the battery of the first battery unit. Therefore, the standby time of the surface ship can be shortened.

The working apparatus may include a plurality of attaching portions each including the power receiving pad, and the first battery unit is attached to one of the plurality of attaching portions. The underwater sailing body may attach the second battery unit to the attaching portion which is one of the plurality of attaching portions and to which the first battery unit is not being attached. According to this configuration, the first battery unit can be detached from the working apparatus after the second battery unit is attached to the working apparatus. With this, the working apparatus can continuously perform work while using the battery as a driving source.

The working apparatus may include: a controller electrically connected to the power receiving pad; and an auxiliary battery configured to supply the electric power to the controller when the first battery unit is being detached from the working apparatus, and the second battery unit is not yet attached to the working apparatus. According to this configuration, even when the number of attaching portions is one, the working apparatus can continuously perform work when replacing the first battery unit with the second battery unit.

The working apparatus may include a first controller electrically connected to the power receiving pad and an observation device and a first communication device electrically connected to the first controller. Each of the first battery unit and the second battery unit may include a second controller electrically connected to the battery and a second communication device electrically connected to the second controller. When the first battery unit or the second battery unit is being attached to the working apparatus, observation data of the observation device may be transmitted from the first controller through the first communication device and the second communication device to the second controller and stored in the second controller. According to this configuration, the observation data can be collected at the same time when the battery of the first battery unit or the battery of the second battery unit is charged underwater or on water at a position away from the working apparatus.

Advantageous Effects of Invention

According to the present invention, the standby time of the surface ship can be shortened.

DESCRIPTION OF EMBODIMENTS

Figure 1:
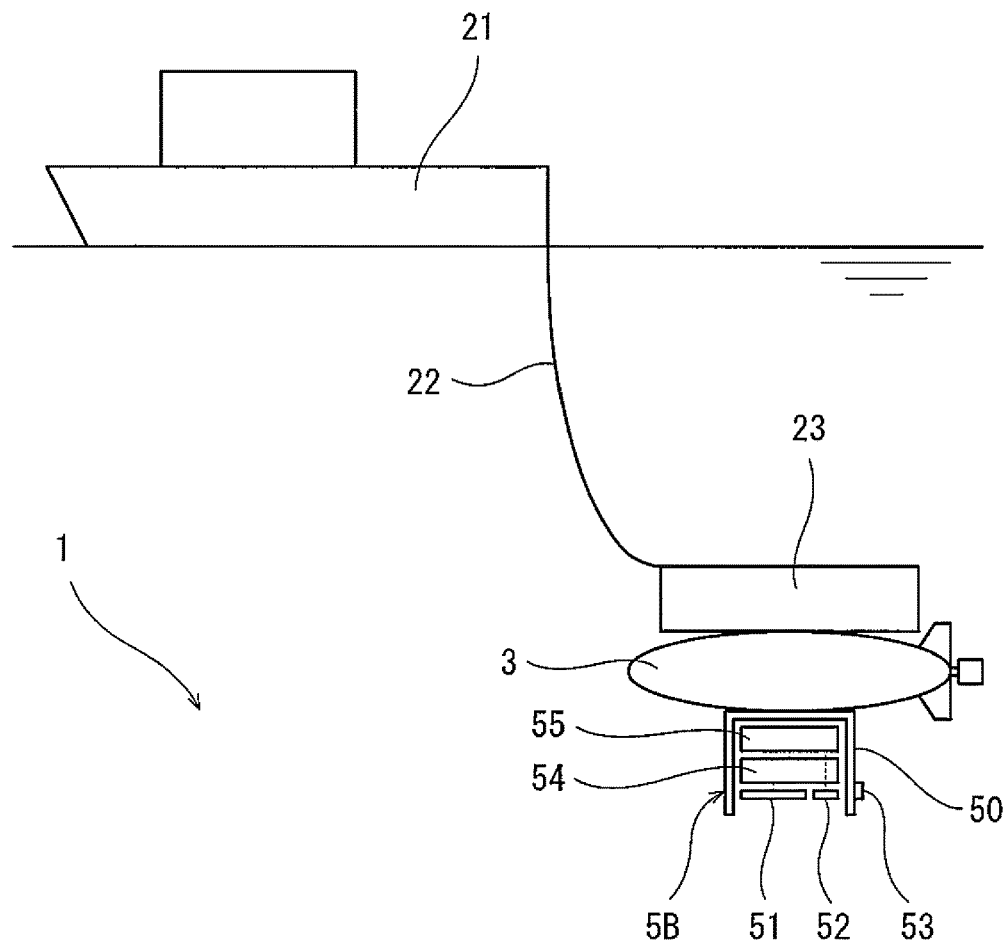
FIG. 1 is a schematic configuration diagram of an underwater power supply system according to one embodiment of the present invention.
Figure 1:
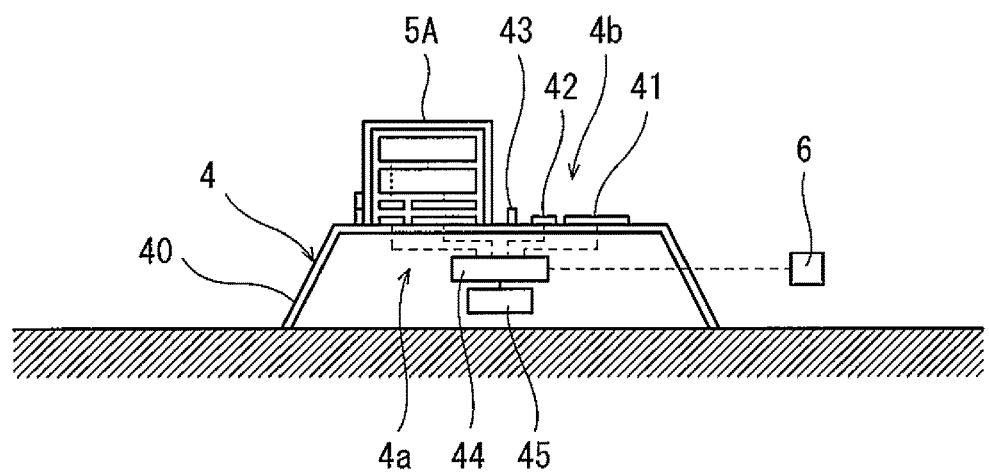

FIG. 1 shows an underwater power supply system 1 according to one embodiment of the present invention. The underwater power supply system 1 includes a working apparatus 4 arranged underwater and an underwater sailing body 3.

In the present embodiment, the working apparatus 4 is an underwater station placed on the seabed and connected to an observation device 6. The underwater station performs work, such as processing of observation data of the observation device 6 and power supply to the observation device 6. Examples of the observation device 6 include a seismometer, a thermometer, a densitometer, a sonic meter, and a camera. It should be noted that the working apparatus 4 may be an AUV which performs work, such as inspection of underwater structures and topographical survey of the seabed.

A first battery unit 5A is detachably attached to the working apparatus 4. The underwater sailing body 3 carries a second battery unit 5B to the working apparatus 4, attaches the second battery unit 5B to the working apparatus 4, and detaches the first battery unit 5A from the working apparatus 4.

The underwater sailing body 3 is provided with a holding device (not shown). The holding device holds or releases the second battery unit 5B or the first battery unit 5A.

In the present embodiment, the underwater sailing body 3 is an AUV which shuttles between the working apparatus 4 and an underwater station 23 suspended from a surface ship 21 through a cable 22. The underwater station 23 charges a battery incorporated in the AUV and receives various data from a controller incorporated in the AUV. It should be noted that the underwater station 23 may be omitted, and the AUV may shuttle between the surface ship 21 and the working apparatus 4. Or, the underwater sailing body 3 may be a ROV (Remotely Operated Vehicle) connected to the surface ship 21 through a cable or may be a manned submersible vessel.

The working apparatus 4 includes two attaching portions 4a and 4b for the battery units. It should be noted that the number of attaching portions (4a, 4b) may be three or more. Specifically, the working apparatus 4 includes a base 40, and part of the base 40 constitutes the attaching portions 4a and 4b.

Figure 2:
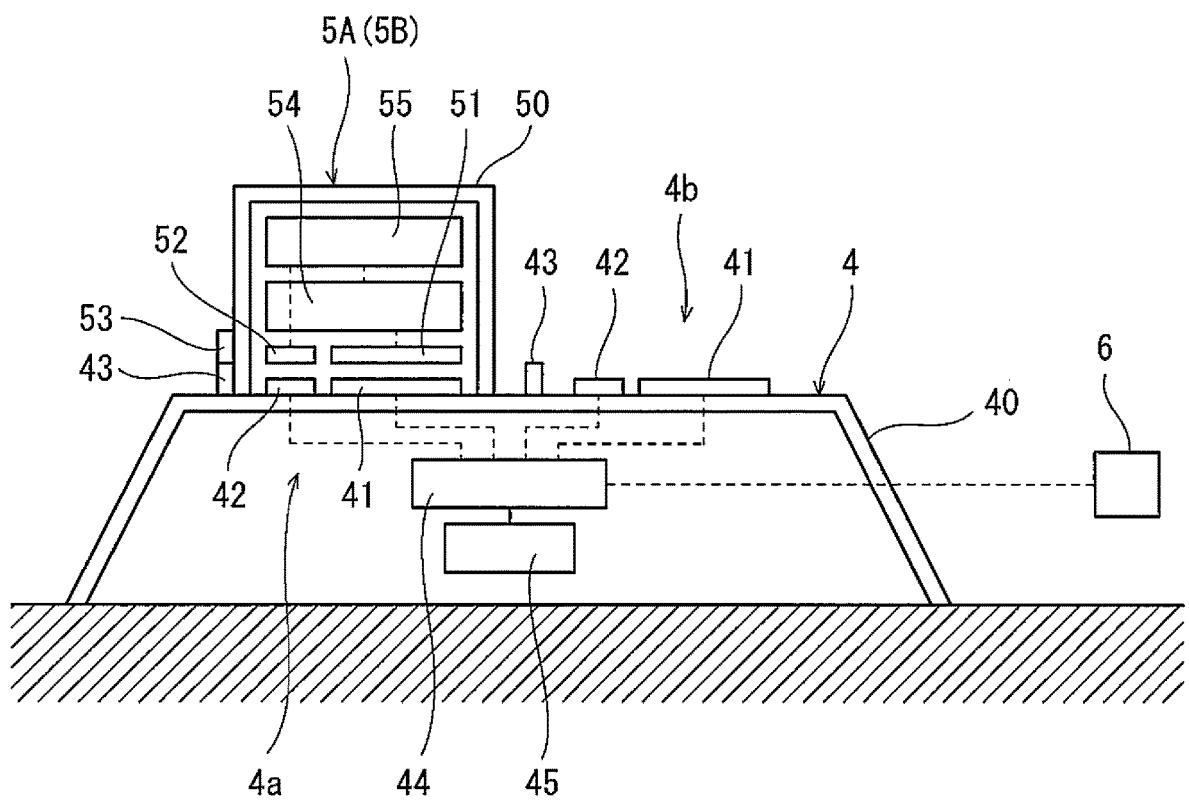
FIG. 2 is an enlarged view of major components of FIG. 1.

As shown in FIG. 2, each of the attaching portions 4a and 4b includes a power receiving pad 41, a first communication device 42, and a positioning fitting 43. The first battery unit 5A is attached to one of the attaching portions 4a and 4b (in the illustrated example, the first battery unit 5A is attached to the attaching portion 4a but may be attached to the attaching portion 4b).

Moreover, the working apparatus 4 includes a first controller 44 and an auxiliary battery 45 electrically connected to the first controller 44. The first controller 44 is electrically connected to the power receiving pads 41 and first communication devices 42 of the attaching portions 4a and 4b. The observation device 6 is electrically connected to the first controller 44.

For example, the first controller 44 is a computer including memories (such as a ROM and a RAM), storages (such as a HDD and a SSD), and a CPU, and programs stored in the ROM are executed by the CPU. The processing of the observation data and the power supply to the observation device 6 are performed by the first controller 44.

When the first battery unit 5A is being detached from the working apparatus 4, and the second battery unit 5B is not yet attached to the working apparatus 4, the auxiliary battery 45 plays a role of supplying power to the first controller 44. After the first battery unit 5A or the second battery unit 5B is attached to the working apparatus 4, the auxiliary battery 45 is charged by a below-described battery 54.

The first battery unit 5A and the second battery unit 5B are the same in structure as each other. Specifically, each of the first battery unit 5A and the second battery unit 5B includes a frame 50, a power supplying pad 51, a second communication device 52, the battery 54, and a second controller 55. The power supplying pad 51, the second communication device 52, the battery 54, and the second controller 55 are arranged in the frame 50. It should be noted that the size of the battery 54 of the first battery unit 5A and the size of the battery 54 of the second battery unit 5B may be the same as each other or may be different from each other.

When the battery unit (5A or 5B) is attached to the attaching portion (4a or 4b) of the working apparatus 4, the frame 50 is placed on the base 40 of the working apparatus 4. The frame 50 includes a positioning fitting 53 that engages with the positioning fitting 43 of the working apparatus 4. For example, one of the positioning fittings 43 and 53 includes a conical projection, and the other of the positioning fittings 43 and 53 includes a conical depression to which the projection is fitted.

When the battery unit (5A or 5B) is attached to the attaching portion (4a or 4b) of the working apparatus 4, the power supplying pad 51 is opposed to the power receiving pad 41 with a small gap, and the second communication device 52 is opposed to the first communication device 42 with a small gap.

The power supplying pad 51 is capable of supplying electric power to the power receiving pad 41 in a non-contact state. The battery 54 is electrically connected to the power supplying pad 51. The battery 54 is also electrically connected to the second controller 55, and the second controller 55 is electrically connected to the second communication device 52.

For example, the second controller 55 is a computer including memories (such as a ROM and a RAM), storages (such as a HDD and a SSD), and a CPU, and programs stored in the ROM are executed by the CPU. The second controller 55 controls the amount of electric power supplied from the battery 54 through the power supplying pad 51 and the power receiving pad 41 to the first controller 44.

Next, the operations of the underwater sailing body 3 will be described. Although not shown in the drawings, the working apparatus 4, the underwater station 23, and the underwater sailing body 3 include respective transponders for mutual acoustic communication.

As shown in FIG. 1, when the first battery unit 5A is being attached to the attaching portion 4a of the working apparatus 4, and the amount of electric power stored in the battery 54 of the first battery unit 5A is small, the working apparatus 4 transmits such information to the underwater station 23 or the underwater sailing body 3 by the acoustic communication. Based on this, the underwater sailing body 3 departs from the underwater station 23.

Figure 3:
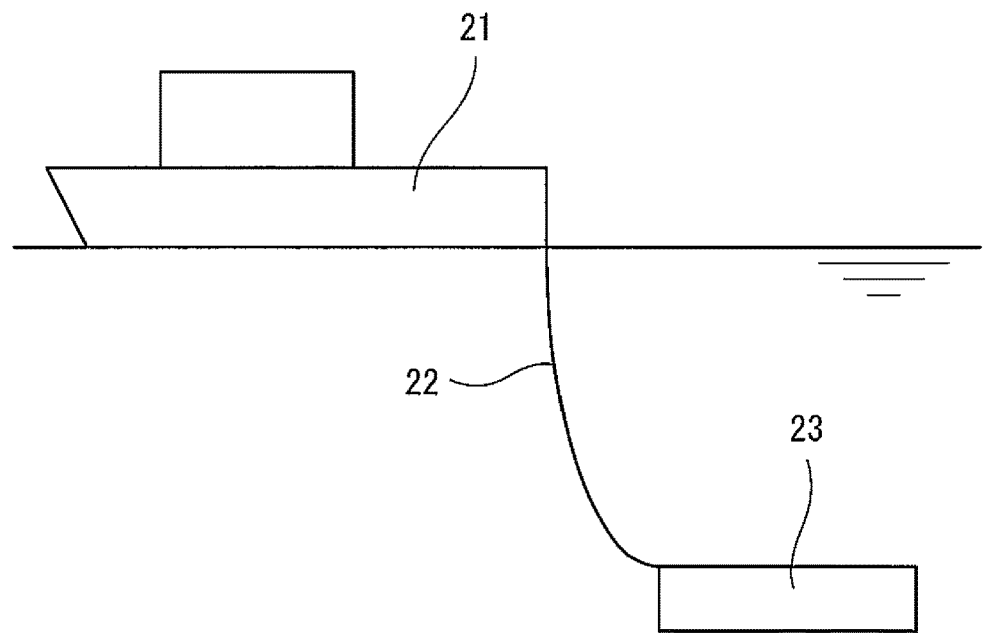
FIG. 3 is a diagram showing that a second battery unit is attached to a working apparatus before a first battery unit is detached from the working apparatus.
Figure 3:
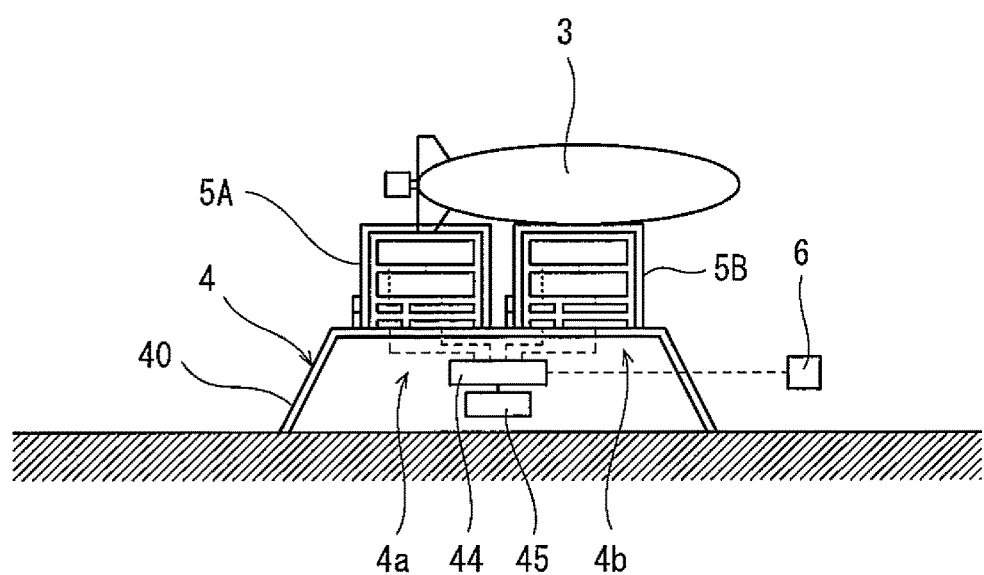
Figure 4:
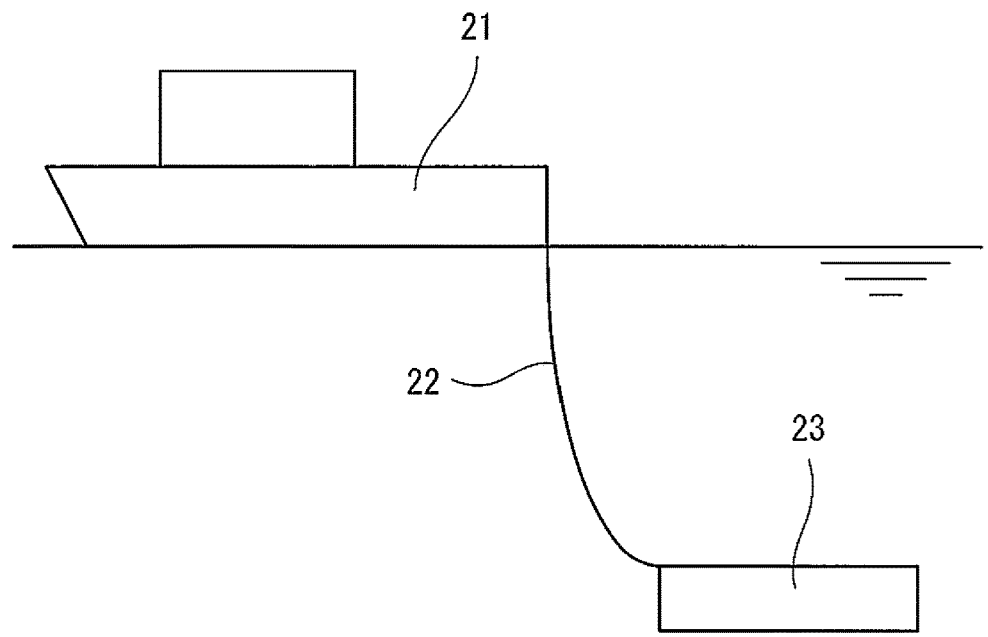
FIG. 4 is a diagram showing that the first battery unit is detached from the working apparatus after the second battery unit is attached to the working apparatus.
Figure 4:
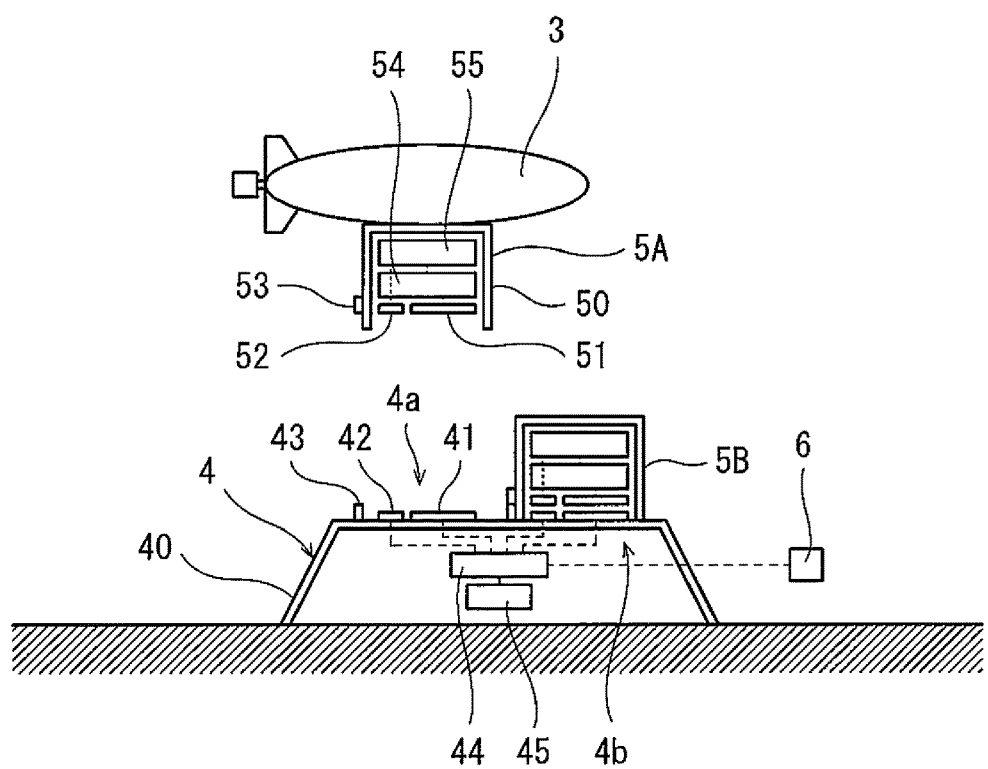

After that, as shown in FIG. 3, the underwater sailing body 3 carries the second battery unit 5B to the working apparatus 4 and attaches the second battery unit 5B to the attaching portion 4b to which the first battery unit 5A is not being attached. Next, as shown in FIG. 4, the underwater sailing body 3 detaches the first battery unit 5A from the working apparatus 4.

After that, the underwater sailing body 3 returns to the underwater station 23, and the battery 54 of the first battery unit 5A is charged underwater by the underwater station 23. It should be noted that in a case where the underwater sailing body 3 shuttles between the surface ship 21 and the working apparatus 4, and when the underwater sailing body 3 returns to the surface ship 21, the first battery unit 5A may be pulled up onto the surface ship 21 together with the underwater sailing body 3, and the battery 54 of the first battery unit 5A may be charged on the water. Or, when the underwater sailing body 3 returns to the surface ship 21, the underwater sailing body 3 may stand by on the water, and only the first battery unit 5A may be pulled up onto the surface ship 21.

When the first battery unit 5A or the second battery unit 5B is being attached to the working apparatus 4, the observation data of the observation device 6 is transmitted from the first controller 44 through the first communication device 42 and the second communication device 52 to the second controller 55 and stored in the second controller 55.

As described above, in the underwater power supply system 1 of the present embodiment, when the amount of electric power stored in the battery 54 of the first battery unit 5A attached to the working apparatus 4 becomes small, the second battery unit 5B is attached to the working apparatus 4 in place of the first battery unit 5A. To be specific, the surface ship 21 does not have to stand by on the sea until the completion of the charging of the battery 54 of the first battery unit 5A. Therefore, a standby time of the surface ship 21 can be shortened.

Moreover, in the present embodiment, the observation data is stored in the second controller 55 of the first battery unit 5A and the second controller 55 of the second battery unit 5B. Therefore, the observation data can be collected at the same time when the battery 54 of the first battery unit 5A or the battery 54 of the second battery unit 5B is charged underwater at a position away from the working apparatus 4 (or at the same time when the battery 54 is charged on the water in a case where the first battery unit 5A is pulled up onto the surface ship 21 together with the underwater sailing body 3 or only the first battery unit 5A is pulled up onto the surface ship 21 as described above).

Modified Example

The present invention is not limited to the above embodiment, and various modifications may be made within the scope of the present invention.

For example, the working apparatus 4 does not necessarily have to include a plurality of attaching portions and may include only one attaching portion. In this case, it is desirable that the working apparatus 4 include a temporarily placing space where the second battery unit 5B is temporarily placed before the first battery unit 5A is replaced with the second battery unit 5B.

It should be noted that when the working apparatus 4 includes a plurality of attaching portions as in the above embodiment, the first battery unit 5A can be detached from the working apparatus 4 after the second battery unit 5B is attached to the working apparatus 4. With this, the working apparatus 4 can continuously perform work while using the battery 54 as the driving source. When the number of attaching portions is one, but the working apparatus 4 includes the auxiliary battery 45, the working apparatus 4 can continuously perform work when replacing the first battery unit 5A with the second battery unit 5B.

Moreover, in a case where the underwater sailing body 3 shuttles between the surface ship 21 and the working apparatus 4, the underwater sailing body 3 may collect, in a first shuttling operation, the first battery unit 5A in which the amount of electric power stored in the battery 54 is small, and the underwater sailing body 3 may carry the second battery unit 5B to the working apparatus 4 in a second shuttling operation. Or, in a case where the underwater station 23 is also provided with a plurality of attaching portions including respective power supplying pads for the battery units, the underwater sailing body 3 may collect, in the first shuttling operation between the underwater station 23 and the working apparatus 4, the first battery unit 5A in which the amount of electric power stored in the battery 54 is small, and the underwater sailing body 3 may carry the second battery unit 5B to the working apparatus 4 in the second shuttling operation.

Furthermore, two underwater sailing bodies 3 that are an underwater sailing body 3 for collecting the first battery unit 5A and an underwater sailing bodies 3 for carrying the second battery unit 5B may be used.

REFERENCE SIGNS LIST

1 underwater power supply system
21 surface ship
23 underwater station
3 underwater sailing body
4 working apparatus
4a, 4b attaching portion
41 power receiving pad
42 first communication device
44 first controller
45 auxiliary battery
5A first battery unit
5B second battery unit
51 power supplying pad
52 second communication device
54 battery
55 second controller

The invention claimed is:

1. An underwater power supply system comprising:
   a working apparatus arranged underwater and including at least one power receiving pad;
   a first battery unit detachably attached to the working apparatus and including a power supplying pad and a battery, the power supplying pad being configured to supply electric power to the power receiving pad in a non-contact state, the battery being electrically connected to the power supplying pad; and
   an underwater sailing body configured to shuttle between the working apparatus and a surface ship or between the working apparatus and an underwater station suspended from the surface ship, the underwater sailing body being configured to carry a second battery unit to the working apparatus, detach the first battery unit from the working apparatus, and attach the second battery unit to the working apparatus, the second battery unit including a power supplying pad and a battery, the power supplying pad being configured to supply the electric power to the power receiving pad in a non-contact state, the battery being electrically connected to the power supplying pad.

2. The underwater power supply system according to claim 1, wherein:
   the working apparatus includes a plurality of attaching portions each including the power receiving pad, and the first battery unit is attached to one of the plurality of attaching portions; and
   the underwater sailing body attaches the second battery unit to the attaching portion which is one of the plurality of attaching portions and to which the first battery unit is not being attached.

3. The underwater power supply system according to claim 1, wherein the working apparatus includes:
   a controller electrically connected to the power receiving pad; and an auxiliary battery configured to supply the electric power to the controller when the first battery unit is being detached from the working apparatus, and the second battery unit is not yet attached to the working apparatus.

4. The underwater power supply system according to claim 1, wherein:
the working apparatus includes
a first controller electrically connected to the power receiving pad and an observation device and
a first communication device electrically connected to the first controller;
each of the first battery unit and the second battery unit includes
a second controller electrically connected to the battery and
a second communication device electrically connected to the second controller; and
when the first battery unit or the second battery unit is being attached to the working apparatus, observation data of the observation device is transmitted from the first controller through the first communication device and the second communication device to the second controller and stored in the second controller.

5. The underwater power supply system according to claim 2, wherein the working apparatus includes:
a controller electrically connected to the power receiving pad; and
an auxiliary battery configured to supply the electric power to the controller when the first battery unit is being detached from the working apparatus, and the second battery unit is not yet attached to the working apparatus.

6. The underwater power supply system according to claim 2, wherein:
the working apparatus includes
a first controller electrically connected to the power receiving pad and an observation device and
a first communication device electrically connected to the first controller;
each of the first battery unit and the second battery unit includes
a second controller electrically connected to the battery and
a second communication device electrically connected to the second controller; and when the first battery unit or the second battery unit is being attached to the working apparatus, observation data of the observation device is transmitted from the first controller through the first communication device and the second communication device to the second controller and stored in the second controller.

7. The underwater power supply system according to claim 3, wherein:
the working apparatus includes
a first controller electrically connected to the power receiving pad and an observation device and
a first communication device electrically connected to the first controller;
each of the first battery unit and the second battery unit includes
a second controller electrically connected to the battery and
a second communication device electrically connected to the second controller; and
when the first battery unit or the second battery unit is being attached to the working apparatus, observation data of the observation device is transmitted from the first controller through the first communication device and the second communication device to the second controller and stored in the second controller.

8. The underwater power supply system according to claim 5, wherein:
the working apparatus includes
a first controller electrically connected to the power receiving pad and an observation device and
a first communication device electrically connected to the first controller;
each of the first battery unit and the second battery unit includes
a second controller electrically connected to the battery and
a second communication device electrically connected to the second controller; and
when the first battery unit or the second battery unit is being attached to the working apparatus, observation data of the observation device is transmitted from the first controller through the first communication device and the second communication device to the second controller and stored in the second controller.

* * * * *